United States Patent
Wang et al.

(10) Patent No.: US 9,444,550 B2
(45) Date of Patent: Sep. 13, 2016

(54) FLEXIBLE VIRTUAL OPTICAL NETWORK PROVISIONING USING DISTANCE-ADAPTIVE MODULATION

(71) Applicant: Fujitsu Limited, Kawasaki-shi, Kanagawa (JP)

(72) Inventors: Xi Wang, Murphy, TX (US); Qiong Zhang, Plano, TX (US); Inwoong Kim, Allen, TX (US); Paparao Palacharla, Richardson, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 14/314,858

(22) Filed: Jun. 25, 2014

(65) Prior Publication Data

US 2015/0104172 A1    Apr. 16, 2015

Related U.S. Application Data

(60) Provisional application No. 61/890,594, filed on Oct. 14, 2013.

(51) Int. Cl.
| | |
|---|---|
| *H04L 12/26* | (2006.01) |
| *H04B 10/27* | (2013.01) |
| *H04J 14/02* | (2006.01) |
| *H04L 12/46* | (2006.01) |

(52) U.S. Cl.
CPC .......... *H04B 10/27* (2013.01); *H04J 14/0254* (2013.01); *H04J 14/0267* (2013.01); *H04J 14/0271* (2013.01); *H04J 14/0284* (2013.01); *H04L 12/4641* (2013.01)

(58) Field of Classification Search
CPC ... H04B 10/27; H04L 12/4641; H04L 45/58; H04L 45/586; H04L 45/64; H04L 45/12; H04L 45/124; H04L 45/125; H04J 14/0254; H04J 14/0267; H04J 14/0271; H04J 14/0284; H04J 14/0221; H04J 14/0279; H04J 14/0269; H04Q 2011/0073; H04Q 2011/0086
See application file for complete search history.

(56) References Cited

U.S. PATENT DOCUMENTS

| | | | |
|---|---|---|---|
| 7,894,469 B2* | 2/2011 | He | H04J 3/12 370/458 |
| 8,799,513 B2* | 8/2014 | Tober | H04L 45/586 370/392 |

(Continued)

OTHER PUBLICATIONS

Extended European Search Report issued in Patent Appl. No. 14185928.0-1851; 7 pages, Feb. 18, 2015.

(Continued)

*Primary Examiner* — Brian O'Connor
(74) *Attorney, Agent, or Firm* — Baker Botts L.L.P.

(57) ABSTRACT

Flexible VON provisioning may include calculating a candidate mapping pattern to satisfy a virtual optical network (VON) demand based on virtual-to-physical node mapping choices. A distance-adaptive routing and spectral slot assignment evaluation of the candidate mapping pattern may be performed. When the VON demand is satisfied by the candidate mapping pattern, the candidate mapping pattern may be added to a valid mapping patterns list. A final mapping pattern may be selected from the valid mapping patterns list, the final mapping pattern having one of a lowest slot layer and a smallest overall slot usage on the valid mapping patterns list. Then, network resources may be reserved based on the final mapping pattern selected to service the VON demand.

14 Claims, 6 Drawing Sheets

(56) References Cited

U.S. PATENT DOCUMENTS

| | | | | |
|---|---|---|---|---|
| 9,054,829 B2* | 6/2015 | Patel | .................... | H04J 14/0227 |
| 9,154,257 B2* | 10/2015 | Hirano | ................ | H04J 14/0267 |
| 9,160,477 B2* | 10/2015 | Patel | .................... | H04J 14/021 |
| 2013/0272711 A1* | 10/2013 | Patel | .................... | H04J 14/0238 |
| | | | | 398/79 |
| 2014/0098673 A1* | 4/2014 | Lee | ........................ | H04L 45/64 |
| | | | | 370/238 |
| 2014/0099119 A1* | 4/2014 | Wei | .................... | H04J 14/0257 |
| | | | | 398/79 |
| 2014/0147120 A1* | 5/2014 | Patel | .................... | H04J 14/0257 |
| | | | | 398/79 |
| 2014/0226985 A1* | 8/2014 | Patel | .................... | H04J 14/021 |
| | | | | 398/79 |
| 2014/0341572 A1* | 11/2014 | Sambo | ................ | H04J 14/0257 |
| | | | | 398/48 |
| 2014/0376915 A1* | 12/2014 | Rival | .................... | H04B 10/27 |
| | | | | 398/58 |
| 2015/0043915 A1* | 2/2015 | Patel | .................... | H04L 45/302 |
| | | | | 398/68 |
| 2015/0055664 A1* | 2/2015 | Kanonakis | ............. | H04B 10/27 |
| | | | | 370/535 |
| 2015/0104166 A1* | 4/2015 | Patel | .................. | H04Q 11/0066 |
| | | | | 398/5 |

OTHER PUBLICATIONS

Zhang et al., "A Survey on OFDM-Based Elastic Core Optical Networking", IEEE Communications Surveys, vol. 15, No. 1, pp. 65-87, Jan. 1, 2013.

Gong et al., "Dynamic transparent virtual network embedding over elastic optical infrastructures", 2013 IEEE International conference on Communications, pp. 3466-3470, Jun. 9, 2013.

A.N. Patel et al., "Distance-adaptive virtual network embedding in software-defined optical networks", OECC 2013, 2 pages.

A. Hammad et al., "Novel Approaches for Composition of Online Virtual Optical Networks Utilizing O-OFDM Technology", ECOC 2013, 3 pages.

S. Peng et al., "Application-aware and Adaptive Virtual Data Centre Infrastructure Provisioning over Elastic Optical OFDM Networks", ECOC 2013, 3 pages.

* cited by examiner

300 — PHYSICAL INFRASTRUCTURE

301 — VIRTUAL OPTICAL NETWORK (VON) REQUEST

401 ⤻     FIRST MAPPING PATTERN

402 ⤻     SECOND MAPPING PATTERN

FLEXIBLE VIRTUAL OPTICAL NETWORK PROVISIONING USING DISTANCE-ADAPTIVE MODULATION

RELATED APPLICATION

This application claims the benefit under 35 U.S.C. §119 (e) of U.S. Provisional Application Ser. No. 61/890,594 filed Oct. 14, 2013 entitled "FLEXIBLE VIRTUAL NETWORK PROVISIONING OVER DISTANCE-ADAPTIVE NETWORKS".

BACKGROUND

1. Field of the Disclosure

The present disclosure relates generally to optical communication networks and, more particularly, to flexible virtual optical network provisioning using distance-adaptive modulation.

2. Description of the Related Art

Telecommunication, cable television and data communication systems use optical networks to rapidly convey large amounts of information between remote points. In an optical network, information is conveyed in the form of optical signals through optical fibers, also referred to as a lightpath.

Software-defined networking (SDN) represents an important step towards network virtualization and/or abstraction and may allow for a logical network entity to be instantiated automatically using software instructions, rather than manually from user input. In this manner, SDN may enable flexible definition of virtual networks. For example, using the OpenFlow communications protocol managed by The Open Network Foundation (ONF), a traffic flow entity may be instantiated using an arbitrary combination of layer identifiers defined in a header space. OpenFlow may use various combinations of traffic identifiers (Internet-protocol (IP) addresses, media access controller (MAC) addresses, port addresses, etc.) at various layers to define a traffic flow. Then, by installing and configuring packet-forwarding rules associated with the flow to physical switches, an OpenFlow controller may ensure that the traffic flow entity instantiates a path that is routed through a network including the physical switches.

OpenFlow's FlowVisor may instantiate a virtual network entity (called a "slice") by associating multiple traffic flow entities with a given slice, whereby each slice is managed by a separate tenant controller, allowing the tenant to control over a portion of network traffic and a subset of the physical network. In OpenFlow, multiple flowspaces may be defined for each network switch. Each flowspace may be associated with a slice, which in turn is managed by a separate controller. FlowVisor may ensure that actions in one slice do not affect another by intercepting and rewriting OpenFlow messages.

The principles and features of SDN technologies were initially deployed with a focus on internet protocol (IP) and Ethernet networks. However, the concept of SDN may be introduced to optical networks as well. For example, the SDN concept may be applied to agile optical networks built using colorless/directionless/flex-grid reconfigurable optical add-drop multiplexers (ROADMs) and multiple modulation formats programmable transponders. An SDN-enabled optical network may be referred to as a Software-Defined Optical Network (SDON), which may be more open, programmable, and application aware. A feature of SDON is optical network virtualization, which may enable network service providers to provision multiple coexisting and isolated virtual optical networks (VONs) over the same physical infrastructure. For example, in conventional optical networks, network services are provided in terms of lightpaths (i.e., optical network paths between given endpoints). In SDONs, network services may be provided in terms of VONs. When provisioning VONs in response to a request, different mapping patterns for mapping a virtual node to physical topology may be possible.

SUMMARY

In one aspect, a disclosed method for network provisioning includes, responsive to receiving a request for a virtual optical network (VON), calculating a first mapping pattern, the first mapping pattern including a mapping of at least two virtual nodes to at least two physical nodes in an optical network. The method may also include evaluating the first mapping pattern for compliance with the request. Distance-adaptive routing and spectral slot assignment may be performed on the first mapping pattern. When the first mapping pattern complies with the request, the method may include designating the first mapping pattern as a first valid mapping pattern, and selecting, from valid mapping patterns for the request including the first valid mapping pattern, a final mapping pattern. The final mapping pattern may have at least one of a lowest spectral slot layer and a smallest spectral slot usage among the valid mapping patterns.

Additional disclosed aspects for network provisioning include a control system and non-transitory computer readable memory media storing processor-executable instructions, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
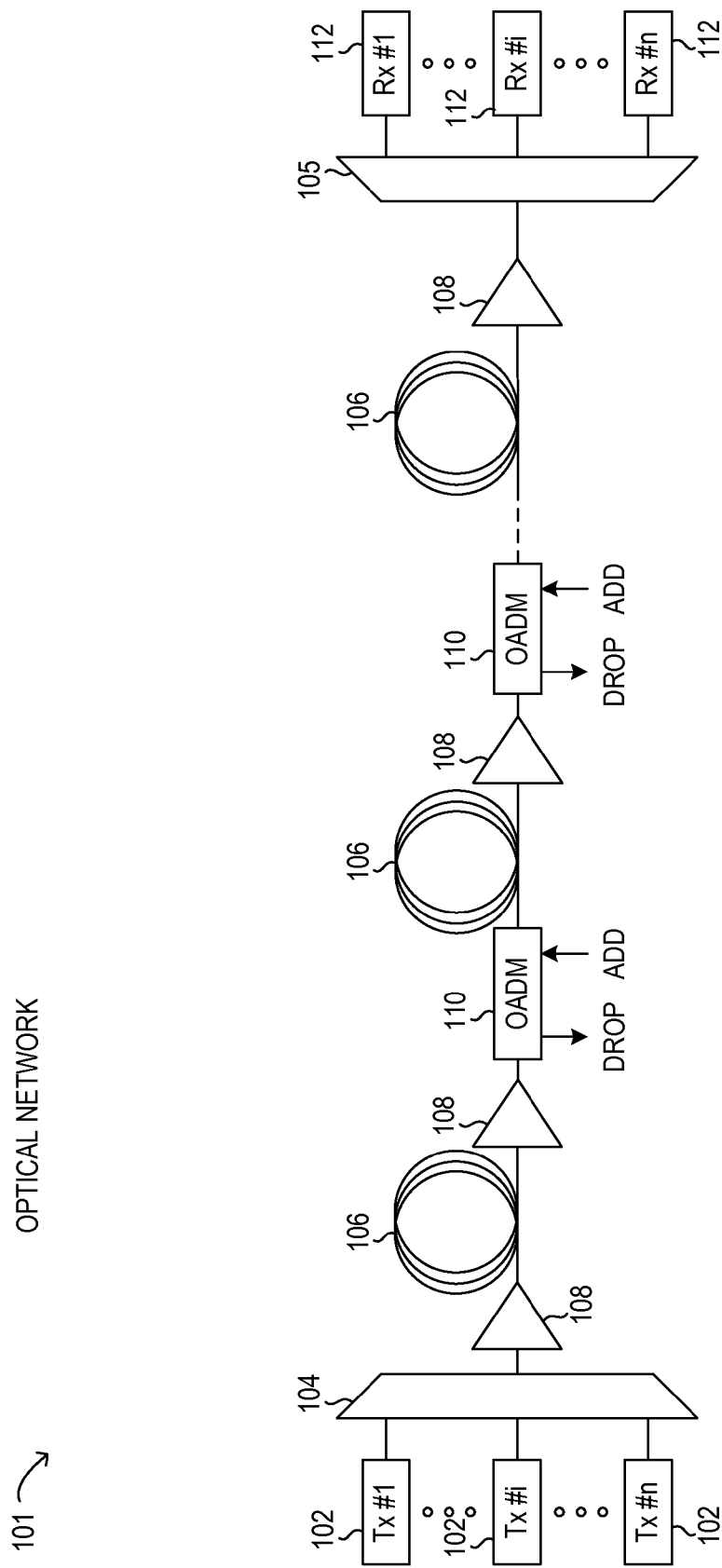
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As noted previously, in a Software-Defined Optical Network (SDON), network services may be provided as virtual optical networks (VONs), instead of lightpaths. VON provisioning may be distinguishable from conventional lightpath provisioning in certain aspects. For example, a lightpath may be a point-to-point connection, while a VON may include a network including multiple virtual nodes and virtual links. Each virtual node in a VON may be mapped to a physical optical node, while each virtual link in a VON may be mapped to a lightpath connecting the corresponding physical optical nodes. In certain embodiments, the lightpaths for a particular VON may be provisioned collectively, rather than individually. In this manner, a VON demand may be served when all virtual links have been successfully mapped to lightpaths.

Furthermore, a particular lightpath may have a fixed source and destination node. In a VON, the virtual node to physical node mapping may be flexible. For example, a virtual node may be mapped to any physical node within a certain geographic area or among a certain number of specified physical nodes, as long as a resulting physical SDON slice satisfies the service-level agreement of the VON. Such flexibility may empower a network service provider to optimize resource usage and reduce service provisioning costs.

VON provisioning may generalize the concept of optical networking service from point-to-point fixed-node-pair lightpath provisioning to multi-point flexible-nodes, or group optical network slicing. Because a lightpath may be a particular instance of a VON including two virtual nodes, each with a fixed node mapping, an SDON service provider may have backward-compatibility to lightpath provisioning with little to no modification of its VON service provisioning system.

Since node mapping prior to path selection may reduce the chance of finding potential paths with distances beneficial for more spectrum-efficient modulation, such an approach may not fully leverage the spectrum utilization efficiency brought by distance-adaptive modulation. As will be described in further detail, the methods and systems described herein may provide effective network capacity increases, which may be observed from a combined effect of flexible node mapping and distance-adaptive modulation. In particular embodiments, a flexible VON provisioning procedure for distance-adaptive flex-grid optical networks supporting flexible node mapping may be utilized to meet a VON demand.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Additionally network 101 may include additional elements not expressly shown, such as a dispersion compensation module (DCM). Also, as mentioned above, although depicted as a point-to-point network, optical network 101 may comprise any suitable network topology for transmitting optical signals such as a ring, a mesh, and/or a hierarchical network topology.

Figure 2:
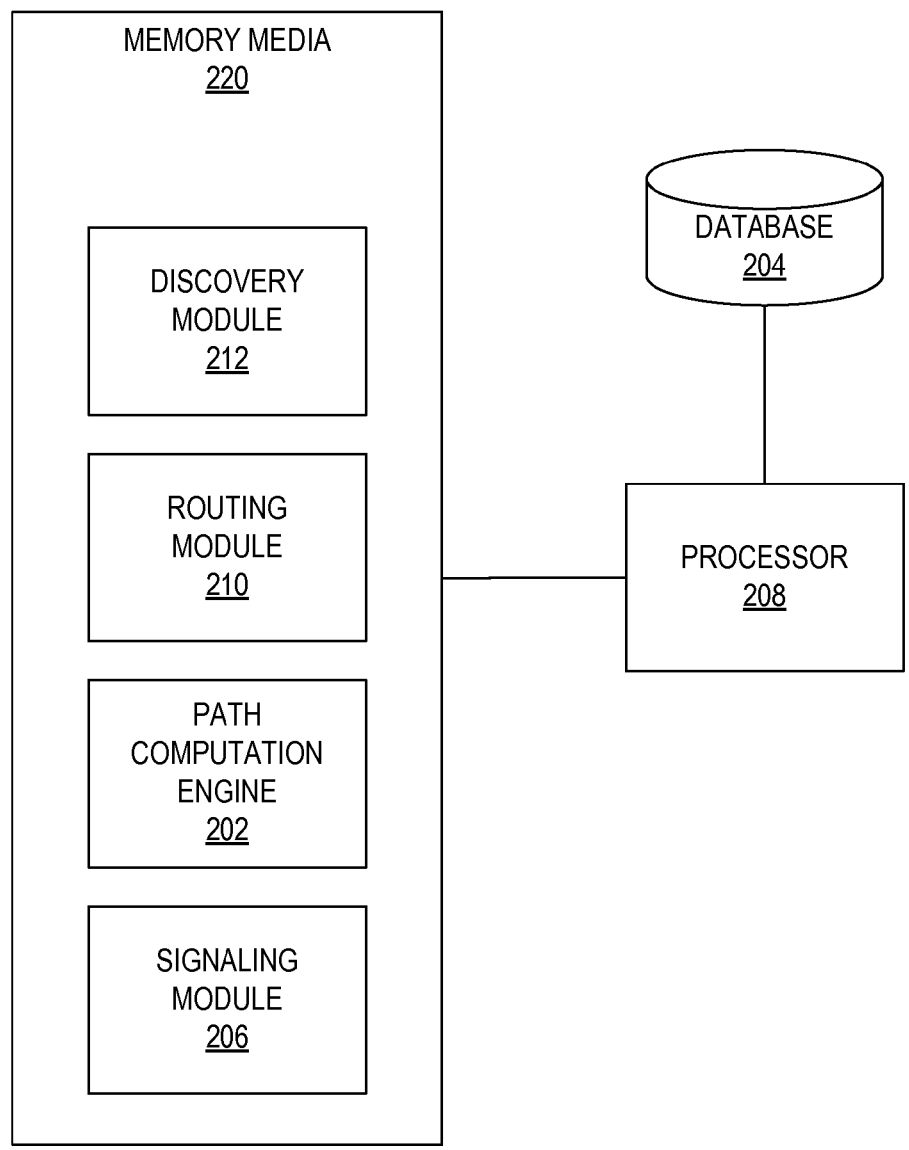
FIG. 2 is a block diagram of selected elements of an embodiment of a control system for an optical network.

Turning now to FIG. 2 a block diagram of selected elements of an embodiment of control system 200 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. As described herein, path computation engine 202, in conjunction with signaling module 206, discovery module 212, and routing module 210, may represent instructions and/or code for implementing various algorithms according to the present disclosure.

In certain embodiments, control system 200 may be configured to interface with a person (i.e., a user) and receive data about the optical signal transmission path. For example, control system 200 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device and/or a network element (not shown in FIG. 2).

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to, fiber type; fiber length; number and/or type of components; data rate; modulation format of the data; input power of the optical signal; number of signal carrying wavelengths (i.e., channels); channel spacing; traffic demand; and/or network topology, among others.

As shown in FIG. 2, routing module 210 may be responsible for propagating link connectivity information to various nodes within an optical network, such as optical network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical network 101. For example, when an ingress node in the optical network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation for flexible VON provisioning, as described herein, control system 200 may represent and/or include a SDON controller, while path computation engine 202 may include functionality for mapping pattern computation (see also FIGS. 4A-D), for example. Then, control system 200 may perform an evaluation of different routing and spectral slot assignments in the calculated mapping patterns, according to the specific lightpaths requested in the VON request. Mapping patterns that satisfy the VON request may be designated as valid mapping patterns. When at least one valid mapping pattern results from the evaluation, the VON request may be satisfied. When multiple valid mapping patterns result from the evaluation, the SDON controller may select a valid mapping pattern based on a lowest occupied number of spectral slots, which has the smallest overall spectral slot usage. The SDON controller may then proceed to reserve the physical network resources according to the selected valid mapping pattern to service the VON request. When no valid mapping patterns are available, the VON request may not be satisfied and may be denied.

Figure 3A:
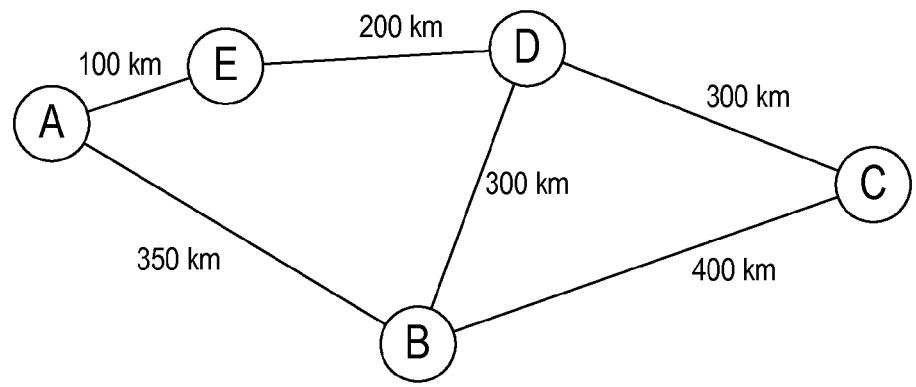
FIG. 3A is a network map of selected elements of an embodiment of a physical infrastructure.

Turning now to FIG. 3A, selected elements of an embodiment of physical infrastructure 300 is shown as a network map. In FIG. 3A, physical infrastructure 300 is shown including physical nodes A, B, C, D, and E, while physical links (i.e., lightpaths) between the respective physical nodes are shown with link span distances in kilometers. It is noted that physical infrastructure 300 is not drawn to scale but illustrates approximate relative locations of the physical nodes from each other.

Figure 3B:
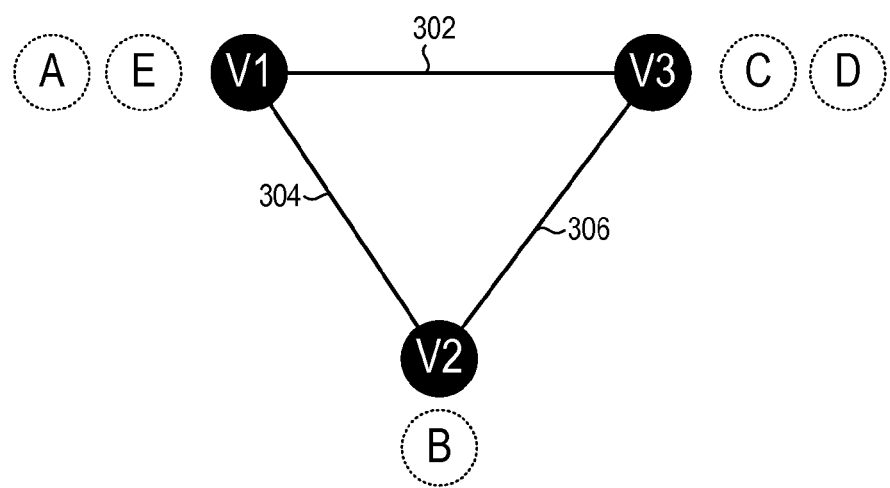
FIG. 3B is a network map of selected elements of an embodiment of a VON request.

Referring now to FIG. 3B, selected elements of an embodiment of VON request 301 are shown. In FIG. 3B, VON request 301 specifies three virtual nodes, V1, V2, and V3, as well as three virtual links. Specifically, virtual link 302 is a link between virtual nodes V1 and V3, virtual link 304 is a link between virtual nodes V1 and V2, while virtual link 306 is a link between virtual nodes V2 and V3. As will be described in further detail herein, VON request 301 is an exemplary VON request that will be used to describe the methods disclosed herein with respect to physical infrastructure 300 (see FIG. 3A). It may be assumed for the purposes of the present disclosure that virtual links 302, 304, and 306 have all been requested with a capacity of 400 gigabits per second (Gbps). It will be understood that, in different embodiments, different capacity specifications may be applied to each individual virtual link associated with a given VON request.

In VON request 301 of FIG. 3B, each one of virtual nodes V1, V2, and V3 may be mapped to at least one of physical nodes A, B, C, D, and E in physical infrastructure 300 (see FIG. 3A). As shown in VON request 301, candidate physical nodes for each of the virtual nodes are shown with dashed lines adjacent the virtual nodes. Specifically, physical nodes A and E may be candidates for mapping to virtual node V1, physical node B may be a candidate for mapping to virtual node V2, while physical nodes C and D may be candidates for mapping to virtual node V3. In the example embodiments of mapping patterns, which will now be described below in further detail with respect to FIGS. 4A-D, and which are based on physical infrastructure 300 and VON request 301, it will be demonstrated how joint consideration of flexible node mapping and distance-adaptive modulation may be beneficial to efficient spectrum utilization.

Turning now to FIGS. 4A, 4B, 4C, and 4D, selected elements of embodiments of mapping patterns 401, 402, 403, and 404 are depicted and are based on physical infrastructure 300 and VON request 301 (see FIGS. 3A and 3B). Furthermore, it may be assumed that physical infrastructure 300 supports two different modulation formats, arbitrarily designated format F1 and format F2. Format F1 may be defined to occupy 1 spectral slot and may be used for link spans up to 400 km in length, while format F2 may be defined to occupy 2 spectral slots and may be used for link spans up to 600 km in length.

Figure 4A:
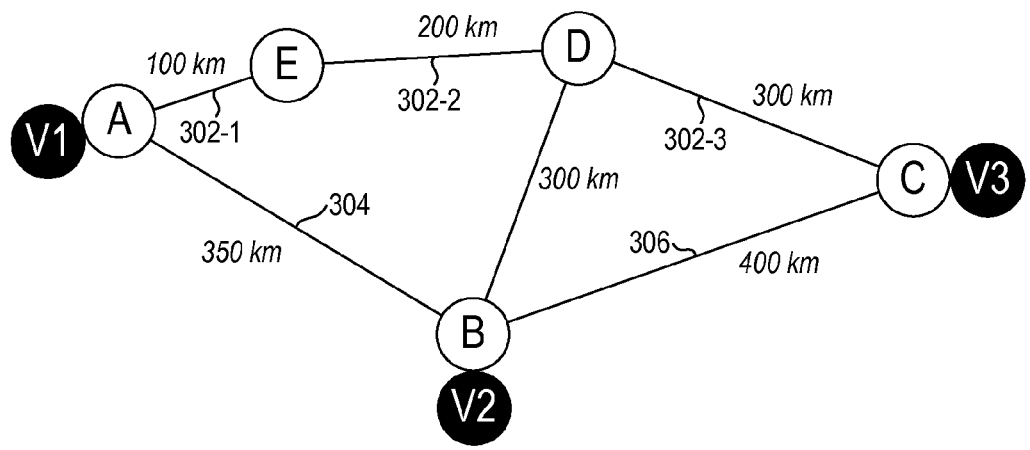
FIGS. 4A, 4B, 4C, and 4D are selected elements of embodiments of mapping patterns.

Referring now to FIG. 4A, first mapping pattern 401 may involve mapping virtual node V1 to physical node A, mapping virtual node V2 to physical node B, and mapping virtual node V3 to physical node C. In the case of first mapping pattern 401, virtual link 304 between virtual nodes V1 and V2 is mapped to the 350 km span between physical nodes A and B, while virtual link 306 between virtual nodes V2 and V3 is mapped to the 400 km span between physical nodes B and C. In first mapping pattern 401, virtual link 302 is mapped to a concatenation of the following physical links: the 100 km span between physical nodes A and E, shown as 302-1; the 200 km span between physical nodes E and D, shown as 302-2; and the 300 km span between physical nodes D and C, shown as 302-3. Based on the criteria for the modulation formats given above, the spectral slots occupied by each virtual link in first mapping pattern 401 is as follows: virtual link 304 has modulation format F1 and occupies 1 spectral slot; virtual link 306 has modulation format F1 and occupies 1 spectral slot; and virtual link 302 has modulation format F2 and occupies 6 spectral slots (2 spectral slots×3 physical spans). Thus, first mapping pattern 401 occupies a total of 8 spectral slots.

Figure 4B:
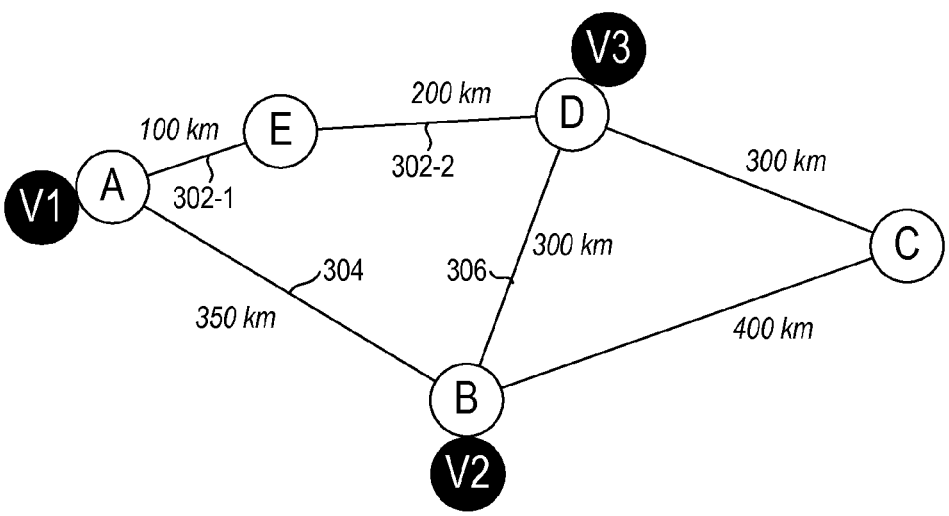

Referring now to FIG. 4B, second mapping pattern 402 may involve mapping virtual node V1 to physical node A, mapping virtual node V2 to physical node B, and mapping virtual node V3 to physical node D. In the case of second mapping pattern 402, virtual link 304 between virtual nodes V1 and V2 is mapped to the 350 km span between physical nodes A and B, while virtual link 306 between virtual nodes V2 and V3 is mapped to the 300 km span between physical nodes B and D. In second mapping pattern 402, virtual link 302 is mapped to a concatenation of the following physical links: the 100 km span between physical nodes A and E, shown as 302-1; and the 200 km span between physical nodes E and D, shown as 302-2. Based on the criteria for the modulation formats given above, the spectral slots occupied by each virtual link in second mapping pattern 402 is as follows: virtual link 304 has modulation format F1 and occupies 1 spectral slot; virtual link 306 has modulation format F1 and occupies 1 spectral slot; and virtual link 302 has modulation format F2 and occupies 2 spectral slots (1 spectral slots×2 physical spans). Thus, second mapping pattern 402 occupies a total of 4 spectral slots.

Figure 4C:
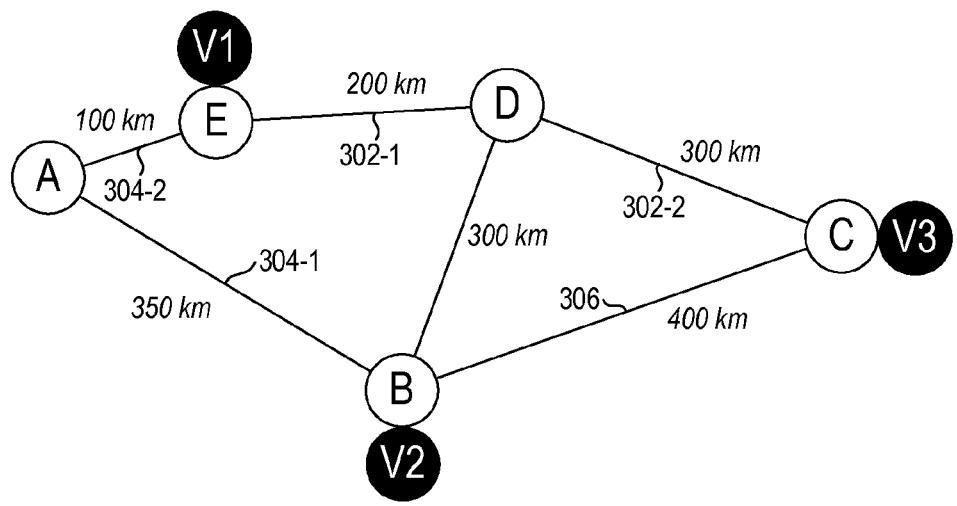

Referring now to FIG. 4C, third mapping pattern 403 may involve mapping virtual node V1 to physical node E, mapping virtual node V2 to physical node B, and mapping virtual node V3 to physical node C. In the case of third mapping pattern 403, virtual link 304 is mapped to a concatenation of the following physical links: the 350 km span between physical nodes B and A, shown as 304-1; and the 100 km span between physical nodes A and E, shown as 304-2. In third mapping pattern 403, virtual link 302 is mapped to a concatenation of the following physical links: the 200 km span between physical nodes E and D, shown as 302-1; and the 300 km span between physical nodes D and C, shown as 302-2. Also in third mapping pattern 403 virtual link 306 between virtual nodes V2 and V3 is mapped to the 400 km span between physical nodes B and C. Based on the criteria for the modulation formats given above, the spectral slots occupied by each virtual link in third mapping pattern 403 is as follows: virtual link 304 has modulation format F2 and occupies 4 spectral slots (2 spectral slots×2 physical spans); virtual link 306 has modulation format F1 and occupies 1 spectral slot; and virtual link 302 has modulation format F2 and occupies 4 spectral slots (2 spectral slots×2 physical spans). Thus, third mapping pattern 403 occupies a total of 9 spectral slots.

Figure 4D:
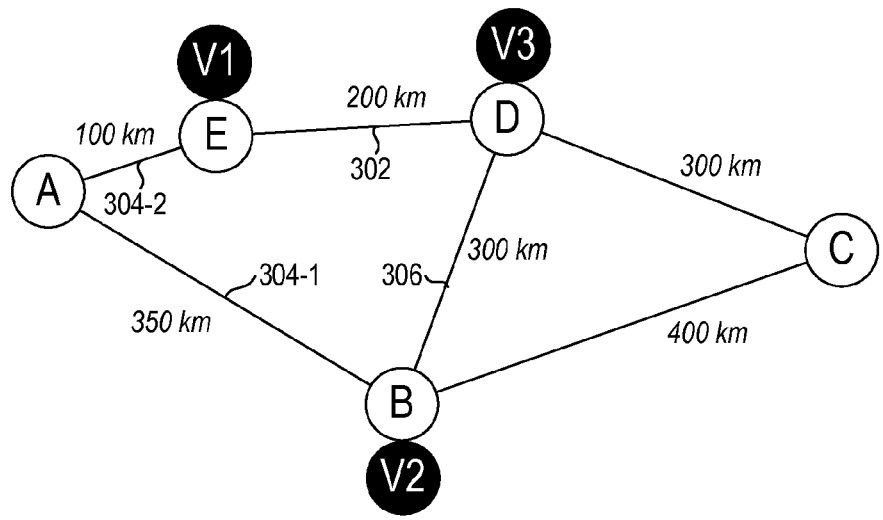

Referring now to FIG. 4D, fourth mapping pattern 404 may involve mapping virtual node V1 to physical node E, mapping virtual node V2 to physical node B, and mapping virtual node V3 to physical node D. In the case of fourth mapping pattern 404, virtual link 304 is mapped to a concatenation of the following physical links: the 350 km span between physical nodes B and A, shown as 304-1; and the 100 km span between physical nodes A and E, shown as 304-2. In third mapping pattern 403, virtual link 302 is mapped to the 200 km span between physical nodes E and D, shown as 302. Also in third mapping pattern 403 virtual link 306 between virtual nodes V2 and V3 is mapped to the 300 km span between physical nodes B and D. Based on the criteria for the modulation formats given above, the spectral slots occupied by each virtual link in fourth mapping pattern 404 is as follows: virtual link 304 has modulation format F2 and occupies 4 spectral slots (2 spectral slots×2 physical spans); virtual link 306 has modulation format F1 and occupies 1 spectral slot; and virtual link 302 has modulation format F1 and occupies 1 spectral slot. Thus, fourth mapping pattern 404 occupies a total of 6 spectral slots.

As evident in the distance-adaptive mapping patterns described above with respect to FIGS. 4A, 4B, 4C, and 4D, different mapping patterns may result in different spectral slot usage conditions, which may result from a compounding effect of flexible node mapping and distance-adaptive modulation. In the example described above, second mapping pattern 402 may be selected based on a lowest number of spectral slots occupied. The method for flexible VON provisioning, as described herein, may calculate various mapping patterns, such as mapping patterns 401-404, based on combinations of virtual node-to-candidate physical node mapping choices, along with other applicable resource constraints and conditions (e.g., modulation formats supported, etc.). In some embodiments, the distance-adaptive routing is based on a service-level agreement associated with the VON, and/or an entity associated with the VON request.

In some embodiments, for example, when the VON request is associated with a large number of virtual nodes and/or results in a large number of potential mapping patterns, certain additional operations may be performed to maintain computational tractability of the flexible VON provisioning methods. Specifically, instead of initially calculating all possible mapping patterns associated with the VON request, certain selective criteria may be applied to the mapping pattern calculation. For example, first a fixed virtual-to-physical node mapping may be attempted, with only one candidate physical node per virtual node. Then, additional candidate physical nodes per virtual node may be selectively added, for example, by starting with 1-hop nearest neighbor nodes, then 2-hop nearest neighbor nodes, etc.

Furthermore, the candidate physical node selection may be processed in stages, while for each stage the evaluation of the mapping patterns is performed in parallel. In certain embodiments, once a valid mapping pattern is discovered, the mapping pattern may be accepted and physical resource allocation may commence, which may be useful in real-time applications where low latency in responding to a VON request is desired. In other instances, a certain fixed number of valid mapping patterns may be generated and/or a time limit may be placed on the evaluation of mapping patterns to find an optimal tradeoff between timeliness and the best possible solution in responding to the VON request.

Figure 5:
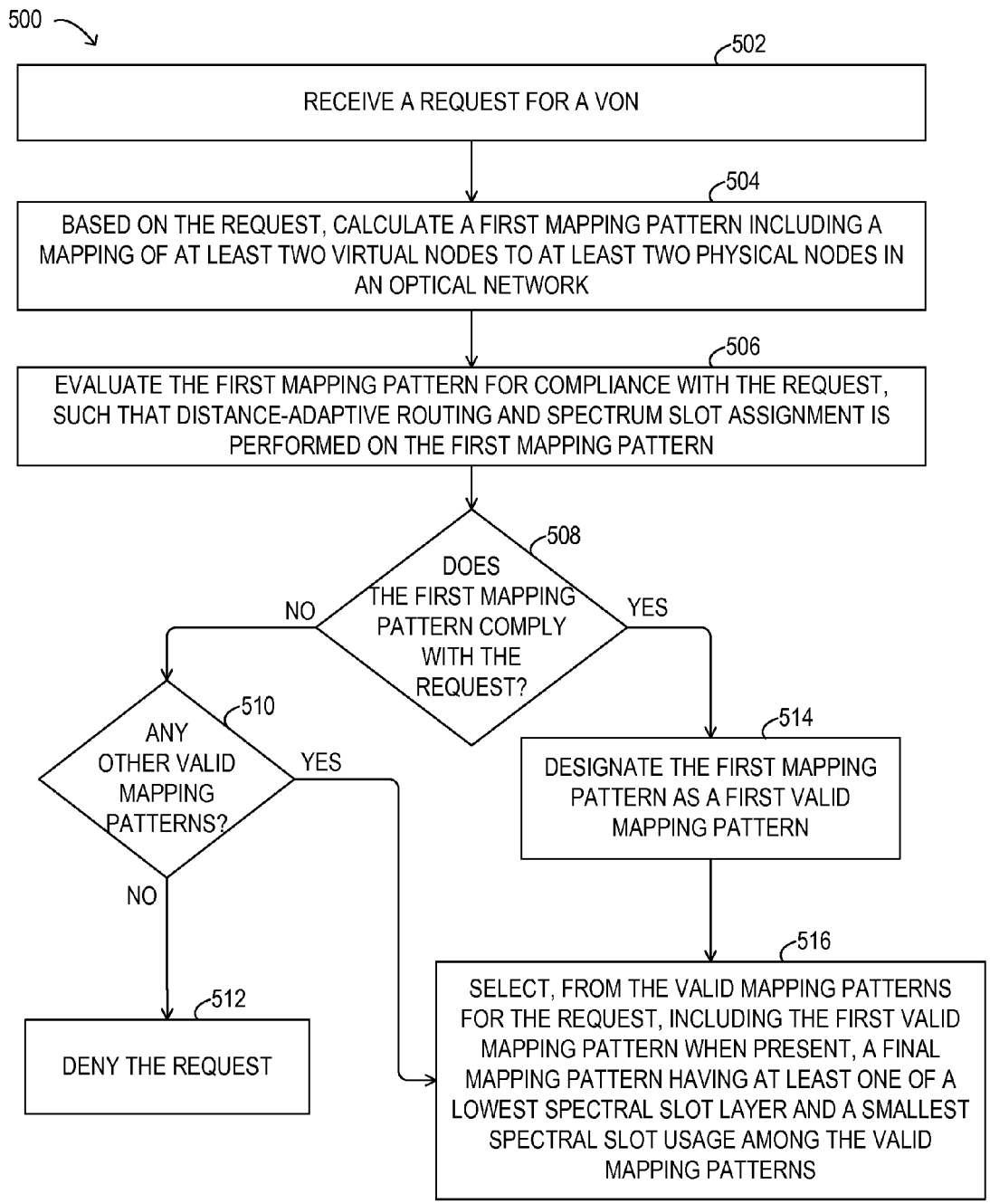
FIG. 5 is a flow diagram of selected elements of an embodiment of a method for flexible VON provisioning.

Referring now to FIG. 5, a block diagram of selected elements of an embodiment of method 500 for flexible VON provisioning is depicted in flowchart form. Method 500 may be performed using network 101 and control system 200 (see FIGS. 1 and 2). It is noted that certain operations described in method 500 may be optional or may be rearranged in different embodiments.

Method 500 may begin by receiving (operation 502) a request for a VON. Based on the request, a first mapping pattern may be calculated (operation 504) including a mapping of at least two virtual nodes to at least two physical nodes in an optical network. The first mapping pattern may be evaluated (operation 506) for compliance with the request, such that distance-adaptive routing and spectrum slot assignment is performed on the first mapping pattern. Then a decision may be made whether the first mapping pattern complies (operation 508) with the request. When the result of operation 508 is NO, a second decision may be made whether any other valid mapping patterns are available (operation 510). When the result of operation 510 is NO, the request may be denied (operation 512). When the result of operation 508 is YES, the first mapping pattern may be designated (operation 514) as a valid mapping pattern. When the result of operation 510 is YES or after operation 514, a final mapping pattern may be selected (operation 516) from the valid mapping patterns for the request, including the first valid mapping pattern when present, the final mapping pattern having at least one of a lowest spectral slot layer and a smallest spectral slot usage among the valid mapping patterns.

As disclosed herein, flexible VON provisioning may include calculating a candidate mapping pattern to satisfy a virtual optical network (VON) demand based on virtual-to-physical node mapping choices. A distance-adaptive routing and spectral slot assignment evaluation of the candidate mapping pattern may be performed. When the VON demand is satisfied by the candidate mapping pattern, the candidate mapping pattern may be added to a valid mapping patterns list. A final mapping pattern may be selected from the valid mapping patterns list, the final mapping pattern having one of a lowest slot layer and a smallest overall slot usage on the valid mapping patterns list. Then, network resources may be reserved based on the final mapping pattern selected to service the VON demand.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for network provisioning, comprising:
responsive to receiving a request for a virtual optical network (VON), calculating a first mapping pattern, the first mapping pattern includes a mapping of at least two virtual nodes to at least two physical nodes in an optical network;
evaluating the first mapping pattern for compliance with the request, wherein distance-adaptive routing and spectral slot assignment is performed on the first mapping pattern; and
when the first mapping pattern complies with the request:
designating the first mapping pattern as a first valid mapping pattern;
selecting, from valid mapping patterns for the request including the first valid mapping pattern, a final mapping pattern, wherein the final mapping pattern has at least one of a lowest spectral slot layer and a smallest spectral slot usage among the valid mapping patterns;
allocating physical network resources, including physical nodes and lightpaths, based on the final mapping pattern; and
responding to the request with an indication of the final mapping pattern.

2. The method of claim 1, further comprising:
evaluating a plurality of mapping patterns for compliance with the request, wherein distance-adaptive routing and spectral slot assignment is performed on each of the mapping patterns; and
when no evaluated mapping patterns comply with the request, denying the request.

3. The method of claim 1, wherein the request specifies a plurality of virtual nodes and a plurality of virtual links respectively connecting the virtual nodes.

4. The method of claim 1, wherein the distance-adaptive routing is based on a service-level agreement associated with the VON.

5. The method of claim 1, wherein the distance-adaptive routing is based on a modulation format supported by the optical network.

6. The method of claim 1, wherein the request specifies a minimum throughput capacity of the VON.

7. The method of claim 1, wherein the first mapping pattern includes a one-to-one relationship between the virtual nodes and the physical nodes.

8. A system for network provisioning, comprising:
a processor configured to access non-transitory computer readable memory media, wherein the memory media store processor-executable instructions, the instructions, when executed by a processor, cause the processor to:
responsive to receiving a request for a virtual optical network (VON), calculate a first mapping pattern, the first mapping pattern includes a mapping of at least two virtual nodes to at least two physical nodes in an optical network;
evaluate the first mapping pattern for compliance with the request, wherein distance-adaptive routing and spectral slot assignment is performed on the first mapping pattern; and
when the first mapping pattern complies with the request:
designate the first mapping pattern as a first valid mapping pattern;

select, from valid mapping patterns for the request including the first valid mapping pattern, a final mapping pattern, wherein the final mapping pattern has at least one of a lowest spectral slot layer and a smallest spectral slot usage among the valid mapping patterns;

allocate physical network resources, including physical nodes and lightpaths, based on the final mapping pattern; and respond to the request with an indication of the final mapping pattern.

9. The system of claim 8, further comprising instructions to:

evaluate a plurality of mapping patterns for compliance with the request, wherein distance-adaptive routing and spectral slot assignment is performed on each of the mapping patterns; and when no evaluated mapping patterns comply with the request, deny the request.

10. The system of claim 8, wherein the request specifies a plurality of virtual nodes and a plurality of virtual links respectively connecting the virtual nodes.

11. The system of claim 8, wherein the distance-adaptive routing is based on a service-level agreement associated with the VON.

12. The system of claim 8, wherein the distance-adaptive routing is based on a modulation format supported by the optical network.

13. The system of claim 8, wherein the request specifies a minimum throughput capacity of the VON.

14. The system of claim 8, wherein the first mapping pattern includes a one-to-one relationship between the virtual nodes and the physical nodes.

* * * * *